Sept. 21, 1965 S. L. LAWRENCE 3,207,092
HAY WAFERING METHOD AND APPARATUS
Filed June 12, 1963 2 Sheets-Sheet 1

INVENTOR.
Stanley L. Lawrence
BY
Barnard, McGlynn & Reising
ATTORNEYS

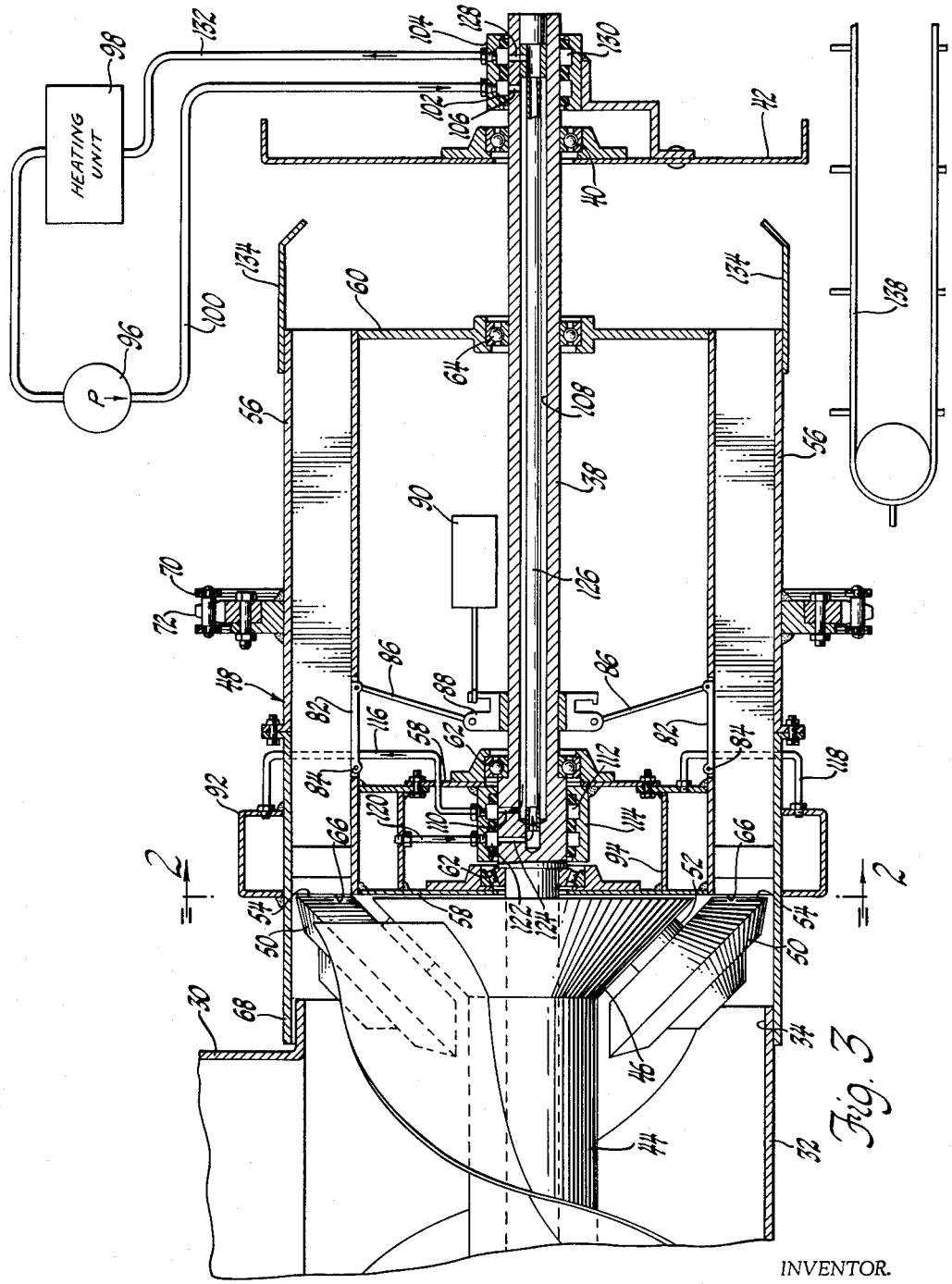

United States Patent Office 3,207,092
Patented Sept. 21, 1965

3,207,092
HAY WAFERING METHOD AND APPARATUS
Stanley L. Lawrence, Livonia, Mich., assignor to Massey-Ferguson, Inc., Detroit, Mich., a corporation of Maryland
Filed June 12, 1963, Ser. No. 287,369
21 Claims. (Cl. 107—14)

This invention relates to a method and apparatus for producing hay wafers and, in particular, to a method and apparatus for field wafering forage crops into stable self-sustaining compressed hay wafers particularly characterized by relatively rotatable hay compression and die cell means in which the wafers are formed providing relatively uniform feeding of hay to be wafered and production of hay wafers.

In recent times, methods and apparatus have been devised for field wafering forage crops into hay wafers comprising means for supplying hay, preferably preconditioned or processed, finely chopped, mixed and blended hay from a windrow in a field, to a rotatable hay feeding and compression means for compressing hay into the entrance ends of an annular series of radially extending die cells communicating therewith to form a compressed extrusion of hay emerging from the exit ends of the respective die cells which may be broken into wafers of the desired length. As a result, as such an apparatus moves through a field of mown hay, continuous extrusions of compressed hay emerge from the exit ends of the respective die cells, and each extrusion is adapted to be engaged with an ejection means adjacent the exit ends of each of the die cells to break the respective extrusions of hay into hay wafers, which then preferably fall upon conveyor means for removal from the apparatus.

Due to the fact that the aforementioned die cells radiate outwardly from the aforementioned rotatable hay compression means, the over-all lengths of the respective die cells must necessarily be relatively short in order to provide an installation of practical size on the usual mobile frame carrying the wafering apparatus. Consequently, the length of any given extrusion of hay being compressed through and confined in a given die cell is necessarily limited due to the aforementioned considerations. On the other hand, it is desirable under certain circumstances to hold or confine a given extrusion of hay within a respective die cell for a long period of time, relatively speaking, to take advantage of the desirable effects of heat generated within the wafering apparatus to ultimately result in quite stable self-sustaining compressed hay wafers of high nutritional value and palatability to livestock. Often it is desirable under certain wafering conditions to apply controlled heating and cooling cycles to a given extrusion of hay being compressed through a given die cell for the purposes aforementioned. In any event, since such a wafering apparatus must be capable of producing finished wafers at a substantially high rate of production, the most practical way of exposing the hay extrusions to heat alone for a relatively long period, or heating and cooling cycles as the case may be, is to extend the lengths of the die cells so as to hold a given extrusion of hay under compression pressures for a longer time than is possible in the relatively short radiating die cells of the prior art as aforementioned. However, to extend the lengths of the prior radiating die cells to the extent required to achieve the foregoing purpose would result in an annular series of radiating die cells of inordinate diameter not capable of being contained as a practical matter on the mobile frame typically employed with such wafering apparatus for towing the latter through a field of mown hay.

In view of the foregoing considerations, the present invention is directed to a method and apparatus for wafering hay comprising supplying hay to be wafered to a hay compression means rotatable relative to an annular series of axially elongated parallel die cells each having axially spaced entrance and exit ends with such entrance ends thereof communicating with the aforementioned compression means whereby the latter may compress hay into and through the respective die cells and form extrusions of hay emerging therefrom adapted to be broken into hay wafers. In this regard, due to the parallel relationship of the respective die cells, the lengths of the latter may be quite great, relatively speaking, while providing a compact installation on the usual mobile frame of the apparatus.

More specifically in this regard, the method and apparatus of this invention are particularly characterized by the fact that the aforementioned die cells are mounted for rotation in unison about a horizontal axis whereby the respective entrance ends thereof travel in a circular path contained within a common vertical plane, the aforementioned compression means including one or more compression rollers rotatable about the circular path of the entrance ends of the die cells means being provided to rotate the die cells and the compression rollers in the same direction and at different speeds to provide relatively uniform feed and compression of hay into and through the horizontally disposed die cells.

Yet more specifically, the invention is further characterized by means for varying the convergent cross sectional areas of at least a portion of the respective die cells simultaneously to a substantially uniform extent to substantially equally vary the resistance to flow of hay extrusions being compressed therethrough, thereby further contributing to the ultimate production of hay wafers at a substantially uniform rate.

In its more specific aspects, the present invention is directed to a wafering method and apparatus of the general type aforementioned further characterized by means for heating a first portion of each of the die cells adjacent the entrance ends thereof to heat the contiguous surface of the extrusion of hay being compressed therethrough while pressure is being applied thereto, and means for cooling a second portion of each of the die cells between the first portion thereof and the exit ends thereof to set the shape of the hay within such second portions of the die cells for ultimate breaking of the extrusions of hay emerging from the exit ends of the die cells into hay wafers of the desired length.

In order to facilitate an understanding of the invention, a preferred embodiment thereof will now be described with reference to the accompanying drawings in which:

FIGURE 3 is an enlarged fragmentary sectional view, partially schematic taken on line 3—3 of FIGURE 1.

Figures 1, 2:
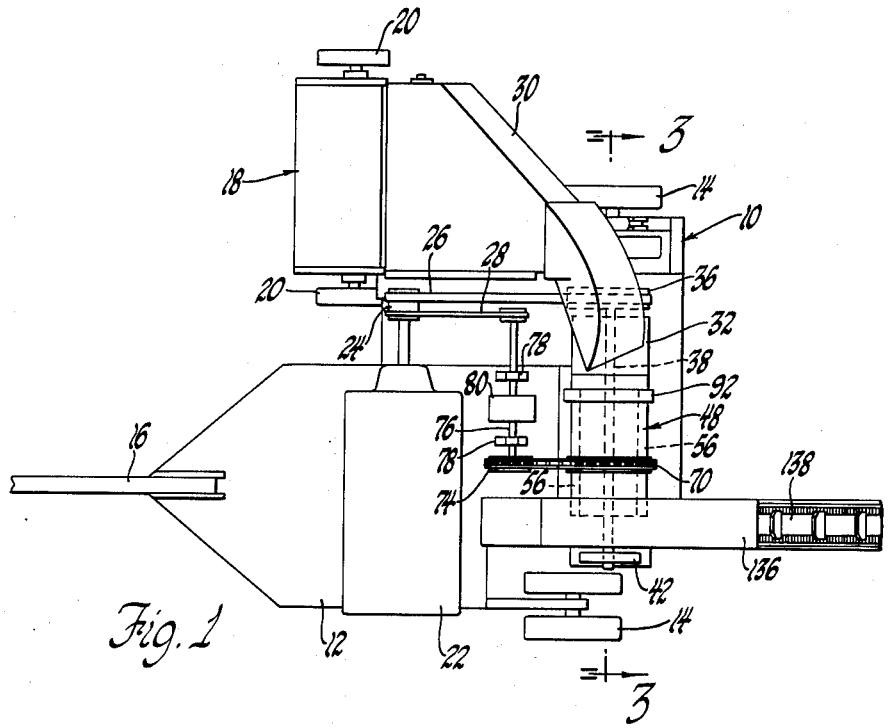
FIGURE 1 is a top plan view, partially schematic in nature, of a hay wafering apparatus illustrating a preferred embodiment of the method and apparatus of this invention.
FIGURE 2 is a view, partly in section and partly broken away to illustrate certain details, taken along line 2—2 of FIGURE 3.

Referring now to the drawings, the numeral 10 in FIGURE 1 generally indicates a hay wafering apparatus comprising a mobile frame 12 equipped with ground-engaging wheel means 14 in the usual manner, and a drawbar 16 adapted to be hitched to a suitable prime mover, such as an agricultural tractor, for drawing the frame along a field of mown hay. A pick-up mechanism for mown hay in the field is indicated generally at 18, is equipped with ground-engaging wheels 20 in the usual manner and is suitably coupled in a conventional manner to the frame of the apparatus so as to be towed with the latter. A suitable power plant or engine 22 is mounted on the frame 12 and includes an output shaft mounting a pulley means 24 entraining the respective belt means 26 and 28 to drive various of the instrumentalities of the apparatus as will be pointed out hereinafter.

The apparatus aforedescribed is adapted to be towed along a field of mown or cut hay, preferably with the hay arranged in windrows to facilitate receipt and pick-up thereof by the pick-up mechanism 18 aforementioned in a substantially continuous fashion for supply to wafering instrumentalities to be described. As the apparatus is towed along the field of hay, the hay in a given windrow is adapted to be picked up in the pick-up mechanism 18, which conventionally includes suitable means conventionally driven from the engine 22 through a pulley and belt system well known in the art and hence not shown, and to be directed thereby into the delivery chute 30 of the pick-up mechanism which delivers the hay through a suitable opening in the side wall of a horizontally disposed generally cylindrical feed hopper 32 suitably secured on the frame 12 and including one axially open end 34 communicating with a die cell construction to be described and an axially opposite closed end wall.

A large pulley or fly wheel 36 is secured to the one end of a horizontally disposed drive shaft 38 exteriorly of the feed hopper adjacent its closed end wall, and is drivingly connected to the power plant or engine 22 by the aforementioned belt means 26, and may be further utilized to transmit engine power to the rotary pick-up mechanism 18 by additional belt means as alluded to above and as known in the art. The drive shaft 38 extends horizontally completely through the feed hopper 32 and axially beyond the open end 34 of the latter, and is suitably rotatably supported throughout its length by bearing means including the bearing means 40 carried by a support frame or plate 42 mounted on the mobile frame 12 of the apparatus.

A multiple flight feed auger 44, herein shown to consist of two flights, has the hub thereof secured on the drive shaft 38 for rotation with the latter within the feed hopper 32 and so as to be radially inwardly spaced from the cylindrical side wall thereof, one end of each of the auger flights terminating at a conical head member 46 of the auger hub projecting axially beyond the aforementioned open end 34 of the feed hopper in communication with a rotatable die cell construction indicated generally at 48. A pair of compression rollers 50, are suitably mounted for idling rotation by bearing means 52 in the head member 46 of the auger hub so as to extend at angles of approximately 45° with respect to the axis of rotation of the drive shaft 38. It will also be noted, particularly from FIGURES 2 and 3, that the respective compression rollers 50 are disposed just to the rear of the path of rotation of the ends of the auger flights projecting beyond the open end 34 of the feed hopper 32, and include beveled roller surfaces 54 disposed in a common vertical plane normal to the axis of rotation of the drive shaft 38 for travel in an annular or circular path coaxial with the drive shaft as the latter rotates.

The rotatable die cell construction 48 comprises an annular or circumferentially spaced series of adjacent axially elongated parallel die cells 56 of suitable cross sectional configuration, herein shown to be rectangular in nature, which are suitably fixedly mounted relative to each other and equi-distantly from the axis of drive shaft 38 as by means of a suitable number of axially spaced wall or bracing members 58 located adjacent the entrance ends thereof and the wall or bracing members 60 adjacent the exit ends thereof. Suitable bearing means 62 and 64 respectively associated with the wall or bracing members 58 and 60 support the die cell construction for rotation about the axis of the drive shaft 38 so that the respective die cells 56, and particularly the entrance ends thereof defined between an annular or circumferentially spaced series of die points having the knife edges 66, travel in an annular or circular path about the axis of rotation of the drive shaft 38 immediately adjacent but slightly spaced from the annular or circular path of rotation of the roller surfaces 54. An axially extending annular skirt or shroud 68 closely embraces the axially open end 34 of the feed hopper 32 and confines the latter for feed of hay to be wafered therefrom by the feed auger 44 so that the latter lays such hay upon and across the knife edges 66 of the die points and the entrance ends of the respective die cells immediately in advance of the rotative path of travel of the rollers 50 which compress the hay, force it past the knife edges and compact it into and through the respective die cells upon successive rotative passes of such rollers.

The die cell construction 48 is adapted to be rotated as a unit about the axis of the drive shaft 38 by means of a drive chain 70 entrained about a sprocket 72 suitably secured to the die cell construction and a drive sprocket 74 secured to one end of a drive train 76 suitably mounted in the bearings 78 on the frame 12 and mounting a pulley at the other end thereof entraining the aforedescribed belt means 28 to receive motive power from the power plant or engine 22. As indicated schematically in FIGURE 1, the aforementioned drive train 76 may include, as desired or required, reduction gearing indicated schematically at 80 to provide the desired speed of rotation of the die cell construction 48.

At this juncture, it may be noted that the drive shaft 38 and, hence, the feed auger 44 carrying the rollers 50 are driven in the same direction as the die cell construction 48 as indicated by the arrows in FIGURE 2, and preferably with the speed of rotation of the drive shaft and auger exceeding that of the die cell construction. For example, the speed of rotation of the drive shaft 38 and feed auger 44 may be in the order of 500 r.p.m. while that of the die cell construction may be 50 r.p.m. Thus, as the frame 12 travels through a field of mown hay which is picked up and delivered to the hopper 32 as aforementioned, such hay is fed continuously by the auger 44 and is laid across the knife edges 66 of the die points and the entrance ends of the respective die cells 56 by the terminal ends of the auger flights just in advance of the rotative path of travel of the rollers 50 rotatably idling on the head 46 of the auger hub, which rollers then compress the hay, force it past the knife edges and compress it into and through the respective die cells upon successive rotative passes thereof.

A wall member 82 is hingedly mounted as indicated at 84 in a portion of the length of each of the respective die cells 56 and is operatively hingedly connected by means of a link 86 to a common control member in the form of a collar 88 selectively axially shiftable along the rotatable drive shaft 38 by a suitable control means indicated schematically at 90, which control means may be manually operable, operably remotely under hydraulic pressure or electrical actuation or the like. Due to the equidistant spacing of the control member or collar 88 from the respective wall members 82 and the fact that the links 86 are of equal length, shifting of the control members or collar to a given selected position along the length of the drive shaft 38 results in hinging the wall members 82 simultaneously and to an equal extent, thereby providing a means for varying the convergent across sectional areas of the associated portions of the respective die cells simultaneously and to a substantially uniform extent to substantially equally vary the resistance to flow of hay being compressed therethrough. Thus, the wall members 82 are shown in a full open flow position in FIGURE 3 of the drawings and will be hinged radially outwardly to decrease the cross sectional areas of the associated die cells upon shifting the control member or collar 88 to the right in FIGURE 3 of the drawings as will be readily apparent and for the purposes aforementioned.

The radially inner and outer concentric annular fluid manifold 92 and 94, respectively, extend circumferentially about and embrace a first relatively short axially extending portion of the entire axial lengths of the respective die cells 56 immediately adjacent the entrance ends thereof, and are adapted to have a heated fluid circulated therethrough for the purpose of heating the contiguous surface of an extrusion of hay confined within the respective die cells and being compressed therethrough at any given time. More specifically, a suitable pump as indicated at 96 is adapted to draw heated fluid from the heating unit 98 and supply such fluid through a conduit 100 to an annular manifold 102 within a sealed housing 104 suitably fixed to the mounting plate 42 and rotatably receiving an extreme end of the drive shaft 38, such manifold being in continuous communication with a radial port 106 communicating with an axial passage 108 extending through the drive shaft and terminating in a radial port 110 communicating with the annular manifold 112 of a housing 114 sealingly embracing the rotatable drive shaft 38 and suitably fixed to one or the other or both of the wall members 58 of the die cell construction 48 for rotation with the latter. Fluid so communicated to the manifold 112 is further conducted through the conduit or conduits 116 to the outer manifold 92 from whence it can circulate to the inner manifold 94 by the conduit or conduits 118 and from the inner manifold through the conduit or conduits 120 to another manifold 122 in the housing 114, through radial port 124 and a tubular conduit 126 disposed within the axial passage 108 and communicating through the radial port 128 with the annular manifold 130 formed in the sealed housing 104. Fluid so circulated to the manifold 130 is returned to the heating unit 98 by the conduit 132.

Thus, the extrusions of hay compressed through the first portions of the die cells 56 adjacent the entrance ends thereof have their surfaces contiguous to the surfaces of the die cells heated by the heated fluid in the manifolds 92 and 94 so as to become at least partially plasticized to facilitate compression thereof, the hay extrusions being successively forced axially through the die cells into the longer second portions thereof downstream from the heated manifolds whereby air at ambient temperatures cool the walls of the die cells and the contiguous surfaces of the hay confined therein to cause the hay to set in shape. Since the heated portions of the die cells are considerably shorter in length than the air cooled portions thereof, it will be readily apparent that extrusions of hay being compacted through the die cells are held for a shorter period of time under heat than under the cooling influence of air, the particular heating and cooling periods being selected as required or desired as a function of the lengths of the die cells for any given speed of rotation of the compression rollers 50 and die cell construction 48.

As hay is so compressed and compacted through the die cells, extrusions of hay of substantially uniform quality, constituence, shape and density are formed which emerge from the exit ends of the die cells for engagement with ejection plate 134 projecting axially beyond the exit ends of the respective die cells and obliquely over the axes of the latter to cause the extrusions of hay to bend and break successively and continuously into wafers of substantially uniform length which drop into an enlarged housing or shroud 136 as illustrated in FIGURE 1 so as to fall upon an elevator type conveyor 138 for removal from the apparatus, preferably into a trailing conveyance.

At this juncture, it may be noted that the longer second portions of the respective die cells 56 need not consist of a completely enclosed wall construction for conduction of cooling ambient air therethrough to the contiguous surfaces of extrusions of hay confined therein. For example, such portions of the die cells may include a suitable number of spaced apertures or comprise rectangularly spaced rods to confine the extrusions of hay, thereby permitting cooling air to be applied partially or substantially wholly directly to the surfaces of the hay extrusions.

In view of the foregoing description, it will now be appreciated that the present invention permits the practical use of die cells of considerably longer length than heretofore possible and, due to the fact that the barrel-like cluster of die cells 56 rotates relative to the compression roller 50, a relatively uniform rate of feed and compression of hay through the die cell construction results. In addition, the respective cross sectional areas of a portion of the respective die cells may be simultaneously and substantially equally varied for the purposes aforedescribed due to selective shifting of the single control member or collar 88.

The embodiments of the invention in which an exclusive property or privilege is claimed are defined as follows:

1. A method of wafering hay comprising supplying hay to be wafered to rotatable mounting means carrying hay compression means rotatable thereon and therewith in an annular path opposite the entrance ends of an annular series of substantially parallel die cells rotatable in unison, along such annular path, and rotating said mounting means including said compression means and said die cells in the same direction at different speeds to substantially uniformly feed and compress hay into and through the latter to form extrusions of hay emerging from exit ends thereof.

2. A method of wafering hay comprising supplying hay to be wafered to rotatable mounting means carrying hay compression means rotatable thereon and therewith opposite and about the annular path of rotation of the entrance ends of an annular series of parallel die cells which are rotatable in unison, and rotating said mounting means including said compression means and said die cells in the same direction with said compression means travelling at a greater speed than said die cells to substantially uniformly feed and compress hay into and through the latter to form extrusions of hay emerging from exit ends thereof.

3. The method according to claim 2 further comprising the step of substantially simultaneously varying the cross sectional areas of at least a portion of each of the die cells to a substantially uniform extent to substantially equally vary the resistance to flow of the extrusions of hay being compressed therethrough.

4. The method according to claim 2 further comprising the steps of heating a first portion of each of the die cells adjacent the entrance ends thereof to heat the contiguous surfaces of the extrusions of hay confined therein, and cooling a second portion of each of the die cells extending between the first portions and the exit ends thereof to cool the contiguous surfaces of the extrusions of hay therein.

5. An apparatus for making compressed hay wafers comprising an annular series of substantially parallel die cells each having spaced entrance and exit ends, said die cells being rotatable in unison whereby said entrance ends thereof travel in an annular path, rotatable mounting means, hay compression means mounted on said mounting means for rotation therewith about said annular path of said entrance ends of said die cells, and means for rotating said mounting means including said compression means and said die cells in the same direction and at different speeds to compress hay into and through the latter to form wafers.

6. The apparatus according to claim 5 wherein said last-named means rotates said compression means at a speed greater than the speed of rotation of said die cells.

7. The apparatus according to claim 5 further comprising means for varying the cross sectional areas of at least a portion of each of said die cells substantially simultaneously and to a uniform extent to substantially equally vary the resistance to flow of hay being compressed therethrough.

8. An apparatus for making compressed hay wafers comprising an annular series of substantially parallel die cells each having spaced entrance and exit ends, said die cells being rotatable in unison whereby said entrance ends thereof travel in an annular path, rotatable feed auger means including an auger flight having an end portion for feeding hay to be wafered to said entrance ends of said die cells, a compression roller mounted on said feed auger means for rotation therewith to the rear of the path of travel of said auger end portion immediately adjacent and about said annular path of said entrance ends of said die cells, and means for rotating said feed auger means and said die cells in the same direction and at different speeds to feed and compress hay into and through the latter to form wafers.

9. An apparatus for making compressed hay wafers comprising an annular series of substantially parallel die cells each having spaced entrance and exit ends, said die cells being rotatable in unison whereby said entrance ends thereof travel in an annular path, feed hopper means communicating with said entrance ends of said die cells, rotatable feed auger means disposed within said feed hopper means and including a plurality of auger flights respectively having end portions to feed hay therefrom to said die cells, a plurality of compression rollers mounted on said feed auger means for rotation therewith and relative thereto to the rear of the path of travel of said respective auger end portions and respectively including roller surfaces immediately adjacent to and traveling in and about said annular path of said entrance ends of said die cells as said feed auger means and said die cells rotate, and means for rotating said feed auger means and said die cells in the same direction and at different speeds to feed and compress hay into and through the latter to form wafers.

10. An apparatus for making compressed hay wafers comprising an annular series of relatively fixed parallel die cells each having spaced entrance and exit ends, said die cells being rotatable in unison whereby said entrance ends thereof travel in an annular path, rotatable feed auger means including a plurality of auger flights respectively having end portions for feeding hay to be wafered to said entrance ends of said die cells, a plurality of compression rollers mounted on said feed auger means for rotation therewith to the rear of the path of travel of said respective auger end portions immediately adjacent to and in and about said annular path of said entrance ends of said die cells, and means for rotating said feed auger means and said die cells in the same direction and at different speeds to feed and compress hay into and through the latter to form wafers.

11. An apparatus for making compressed hay wafers comprising an annular series of relatively fixed parallel die cells each having spaced entrance and exit ends, said die cells being rotatable in unison about an axis parallel to and substantially equidistantly spaced from the respective axes of said die cells whereby said entrance ends thereof travel in an annular path about said axis of rotation, feed hopper means communicating with said entrance ends of said die cells, rotatable feed auger means disposed within said feed hopper means and including a plurality of auger flights respectively having end portions to feed hay therefrom to said entrance ends of said die cells, a plurality of compression rollers mounted on said feed auger means for rotation therewith and relative thereto to the rear of the path of travel of said respective auger end portions and respectively including roller surfaces immediately adjacent to and traveling in and about said annular path of said entrance ends of said die cells as the latter and said feed auger means rotate, and means for rotating said feed auger means and said die cells in the same direction and at different speeds to feed and compress hay into and through the latter to form wafers.

12. The apparatus according to claim 11 wherein said last-named means rotates said feed auger means in the same direction as said die cells at a speed greater than the speed of rotation of the latter.

13. An apparatus for making compressed hay wafers comprising a support shaft, an annular series of relatively fixed axially elongated die cells extending parallel to each other and said support shaft and each having axially spaced entrance and exit ends, means mounting said die cells for rotation in unison about said support shaft whereby said entrance ends thereof travel in an annular path about said support shaft, rotatable feed auger means including a plurality of auger flights respectively having end portions for feeding hay to be wafered to said entrance ends of said die cells, a plurality of compression rollers mounted on said feed auger means for rotation therewith and relative thereto to the rear of the path of travel of said respective auger end portions and respectively including roller surfaces disposed immediately opposite and traveling in and about said annular path of rotation of said entrance ends of said die cells, and means for rotating said feed auger means and said die cells in the same direction and at different speeds to feed and compress hay into and through the latter to form wafers.

14. The apparatus according to claim 13 further comprising means for varying the cross sectional areas of at least a portion of each of said die cells substantially simultaneously and to a uniform extent to substantially equally vary the resistance to flow of hay being compressed therethrough.

15. The apparatus according to claim 14 wherein said means for varying the cross sectional areas of said die cells comprises a wall member hingedly mounted on and forming a part of said respective die cells, a control member shiftable along said support shaft, linkage means interconnecting said control member and said respective wall members, and means operatively connected to said control member to control the position of the latter along said support shaft.

16. The apparatus according to claim 13 further comprising means for heating a first portion of each of said die cells adjacent the entrance ends thereof to heat the contiguous surface of the hay confined therein while pressure is being applied thereto, and means for cooling a second portion of each of said die cells extending between said first portion and said exit ends thereof.

17. The apparatus according to claim 16 wherein said heating means comprises annular fluid manifolding interconnecting said first portions of said respective die cells, a source of heated fluid, and means for circulating said fluid through said support shaft and said manifolding.

18. The apparatus according to claim 17 wherein the lengths of said first portions of said die cells are less than the lengths of said second portions thereof, whereby the surface of the hay compressed through said die cells is heated for a shorter period of time than it is cooled.

19. An apparatus for making compressed hay wafers comprising an annular series of relatively fixed axially elongated parallel die cells each having spaced entrance and exit ends, said respective entrance end of said die cells being disposed in a common plane, means mounting said die cells for rotation in unison about an axis parallel to and substantially equidistantly spaced from the respective axes of said die cells whereby said entrance ends thereof travel in an annular path about said axis of rotation, rotatable feed auger means including a plurality of auger flights respectively having end portions for feeding hay to be wafered to said entrance ends of said die cells, a plurality of compression rollers respectively including roller surfaces disposed in a common plane immediately adjacent and parallel to said common plane of said entrance ends of said die cells, means mounting said rollers on said feed auger means for rotation therewith and relative thereto to the rear of the path of travel of said respective auger end portions and for travel in and about said annular path of said entrance ends of said die cells to compress hay into and therethrough to form wafers, and means for rotating said feed auger means and said die cells in the same direction and at different speeds.

20. The apparatus according to claim 19 wherein said last-named means rotates said feed auger means in the same direction as said die cells at a speed greater than the speed of rotation of the latter.

21. An apparatus for making compressed hay wafers comprising an annular series of relatively fixed substantially parallel die cells each having spaced entrance and exit ends, said die cells being rotatable in unison whereby said entrance ends thereof travel in an annular path, rotatable mounting means, a compression roller mounted on said mounting means for rotation therewith immediately adjacent to and about said annular path of said entrance ends of said die cells, and means for rotating said mounting means and said die cells in the same direction and at different speeds to feed and compress hay into and through the latter to form wafers.

References Cited by the Examiner

UNITED STATES PATENTS

| | | | |
|---|---|---|---|
| 1,467,883 | 9/23 | Sizer | 100—157 |
| 1,490,162 | 4/24 | Dow. | |
| 1,994,371 | 3/35 | Sizer | 107—8.35 |
| 2,020,510 | 11/35 | Meakin | 107—8.35 |
| 2,958,900 | 11/60 | Meakin | 18—12 |
| 3,016,026 | 1/62 | Sorensen | 107—14 |
| 3,134,344 | 5/64 | Lundell | 107—14 |

FOREIGN PATENTS

| | | |
|---|---|---|
| 613,028 | 5/35 | Germany. |
| 691,867 | 5/53 | Great Britain. |

WALTER A. SCHEEL, *Primary Examiner.*